United States Patent
Yamaguchi et al.

(10) Patent No.: US 10,643,783 B2
(45) Date of Patent: May 5, 2020

(54) TRANSFORMER AND DC-DC CONVERTER

(71) Applicants: OMRON Corporation, Kyoto (JP);
Advanced Power Technology Corporation, Kanagawa (JP)

(72) Inventors: Yoshihiko Yamaguchi, Kyoto (JP);
Makoto Ohashi, Uji (JP); Masayuki Suetomi, Yokohama (JP); Tatsumi Yamamoto, Yokohama (JP)

(73) Assignees: OMRON Corporation, Kyoto (JP);
Advanced Power Technology Corporation, Kanagawa (JP)

( * ) Notice: Subject to any disclaimer, the term of this patent is extended or adjusted under 35 U.S.C. 154(b) by 61 days.

(21) Appl. No.: 15/842,903

(22) Filed: Dec. 15, 2017

(65) Prior Publication Data

US 2018/0261378 A1    Sep. 13, 2018

(30) Foreign Application Priority Data

Mar. 10, 2017  (JP) .................. 2017-045697

(51) Int. Cl.
*H01F 17/04* (2006.01)
*H01F 27/28* (2006.01)
(Continued)

(52) U.S. Cl.
CPC ............ *H01F 27/2823* (2013.01); *H01F 5/02* (2013.01); *H01F 27/38* (2013.01); *H01F 38/08* (2013.01);
(Continued)

(58) Field of Classification Search
CPC ....... H01F 38/08; H01F 27/38; H01F 27/2823
(Continued)

(56) References Cited

U.S. PATENT DOCUMENTS

| | | | | |
|---|---|---|---|---|
| 5,719,547 A | * | 2/1998 | Kaneko | H01F 27/29 336/180 |
| 8,749,336 B2 | * | 6/2014 | Lee | H01F 27/325 336/198 |
| 2011/0074533 A1 | * | 3/2011 | Phadke | H01F 27/2866 336/150 |

FOREIGN PATENT DOCUMENTS

| | | |
|---|---|---|
| CN | 202839244 | 3/2013 |
| JP | S63175405 | 7/1988 |

(Continued)

OTHER PUBLICATIONS

"Search Report of Europe Counterpart Application", dated Feb. 13, 2018, p. 1 to p. 8, in which the listed references were cited.

*Primary Examiner* — Ronald Hinson
(74) *Attorney, Agent, or Firm* — JCIPRNET

(57) ABSTRACT

A technology capable of setting a leakage inductance to a predetermined value and enabling miniaturization is provided. In a transformer including a primary coil and a secondary coil which are coaxially provided, the primary coil includes a first primary coil portion and a second primary coil portion in series, the secondary coil includes a first secondary coil portion and a second secondary coil portion in series, the second primary coil portion and the second secondary coil portion are provided outside the first primary coil portion and the first secondary coil portion, and a degree of coupling between the second primary coil portion and the second secondary coil portion is set to be lower than a degree of coupling between the first primary coil portion and the first secondary coil portion.

4 Claims, 3 Drawing Sheets

(51) Int. Cl.
  *H01F 5/02* (2006.01)
  *H01F 27/38* (2006.01)
  *H01F 38/08* (2006.01)
  *H02M 3/335* (2006.01)

(52) U.S. Cl.
  CPC .... *H02M 3/33576* (2013.01); *H02M 3/33584* (2013.01)

(58) Field of Classification Search
  USPC .......................................................... 336/221
  See application file for complete search history.

(56) References Cited

FOREIGN PATENT DOCUMENTS

| | | |
|---|---|---|
| JP | 2008085004 | 4/2008 |
| JP | 2013074144 | 4/2013 |

\* cited by examiner

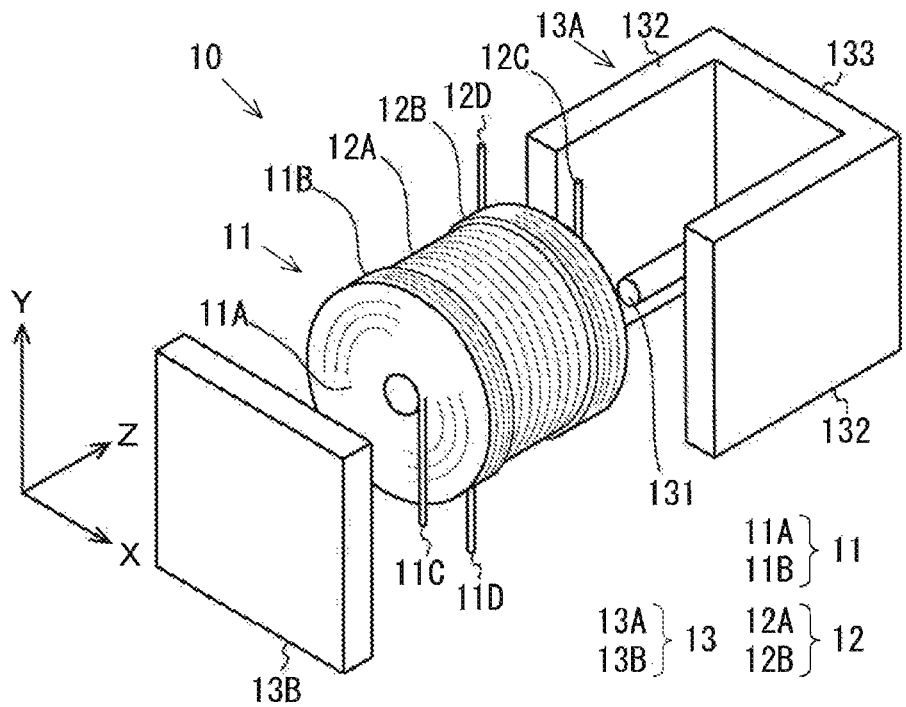
FIG. 3
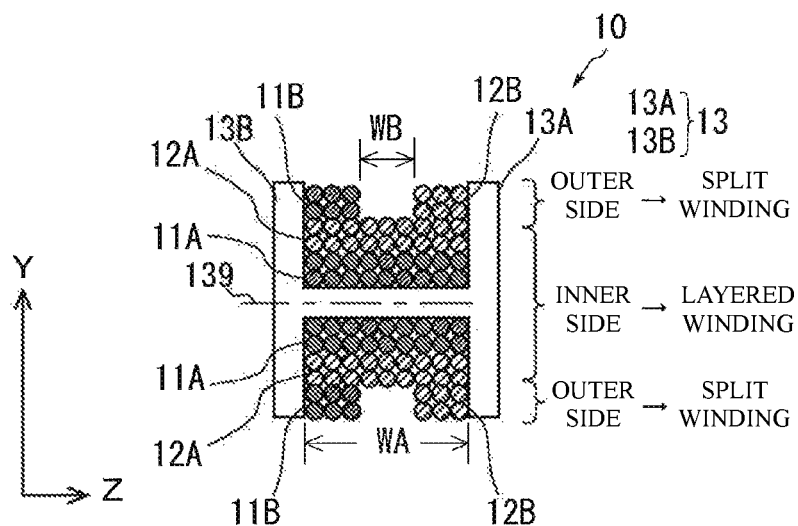
FIG. 4
| | 4kW | | 6kW | |
|---|---|---|---|---|
| | COMPARATIVE EXAMPLE 1 | EMBODIMENT 1 | COMPARATIVE EXAMPLE 2 | EMBODIMENT 2 |
| VOLUME RATIO | 100% | 74.20% | 100% | 82.90% |
| WEIGHT RATIO | 100% | 87.20% | 100% | 95.60% |
| LOSS RATIO | 100% | 48.90% | 100% | 40.90% |
FIG. 5

TRANSFORMER AND DC-DC CONVERTER

CROSS-REFERENCE TO RELATED APPLICATION

This application claims the priority benefits of Japan Patent Application No. 2017-045697, filed on Mar. 10, 2017. The entirety of the above-mentioned patent application is hereby incorporated by reference herein and made a part of this specification.

BACKGROUND

Technical Field

The disclosure relates to a transformer and a direct current to direct current (DC-DC) converter.

Description of Related Art

In isolated DC/DC converters, the leakage inductance of a transformer may be used as an energy storage element of the converter. Thereby, it can be expected that downsizing of an entire circuit will be possible.

In order to adjust such a leakage inductance of a transformer, there are various methods including devising a core structure for the transformer (JP-A-2008-85004), devising a winding method for winding wires (JP-A-2013-74144), or the like.

When the leakage inductance is adjusted by providing a magnetic gap in a core as described in JP-A-2008-85004, if the magnetic gap is enlarged to realize a desired leakage inductance, the core becomes large, causing an increase in size of the device.

Similarly, as described in JP-A-2013-74144, when a primary coil and a secondary coil are arranged in parallel in an axial direction, the transformer becomes large in the axial direction, causing an increase in size of the device.

SUMMARY

A transformer according to one embodiment of the disclosure is configured to have a primary coil and a secondary coil which are coaxially provided, in which the primary coil includes a first primary coil portion and a second primary coil portion in series, the secondary coil includes a first secondary coil portion and a second secondary coil portion in series, the second primary coil portion and the second secondary coil portion are provided outside the first primary coil portion and the first secondary coil portion, and a degree of coupling between the second primary coil portion and the second secondary coil portion is set to be lower than a degree of coupling between the first primary coil portion and the first secondary coil portion.

A DC-DC converter according to one embodiment of the disclosure includes the transformer.

BRIEF DESCRIPTION OF THE DRAWINGS

FIG. 3 is an exploded perspective view of the transformer.
FIG. 4 is a cross-sectional view taken along line A-A illustrated in FIG. 2.

FIG. 5 is a view showing a comparison example between a conventional configuration in which a choke coil is provided separately from a transformer and a configuration of the transformer of the present embodiment.

DESCRIPTION OF THE EMBODIMENTS

The disclosure provides a technology capable of setting a leakage inductance to a predetermined value and enabling miniaturization.

According to one embodiment of the disclosure, a transformer is configured to have a primary coil and a secondary coil which are coaxially provided, in which the primary coil includes a first primary coil portion and a second primary coil portion in series, the secondary coil includes a first secondary coil portion and a second secondary coil portion in series, the second primary coil portion and the second secondary coil portion are provided outside the first primary coil portion and the first secondary coil portion, and a degree of coupling between the second primary coil portion and the second secondary coil portion is set to be lower than a degree of coupling between the first primary coil portion and the first secondary coil portion.

Thereby, in the transformer of one embodiment of the disclosure, the leakage inductance can be set to a predetermined value by adjusting the number of turns of the second primary coil portion and the second secondary coil portion having a low degree of coupling, or a ratio of the number of turns of the second primary coil portion to the first primary coil portion and a ratio of the number of turns of the second secondary coil portion to the first secondary coil portion.

In the transformer according to one embodiment of the disclosure, the first primary coil portion and the first secondary coil portion may have a layered winding structure, and the second primary coil portion and the second secondary coil portion may form a split winding structure.

Thereby, the first primary coil portion and the first secondary coil portion mainly transmit electric power, and the second primary coil portion and the second secondary coil portion mainly adjust the leakage inductance, and since a portion contributing to the power transmission and a portion contributing to the adjustment of leakage inductance are clearly separated, it is easy to design the transformer and set the leakage inductance.

According to one embodiment of the disclosure, it is possible to provide a technology for setting a leakage inductance to a predetermined value and enabling miniaturization.

Figure 1:
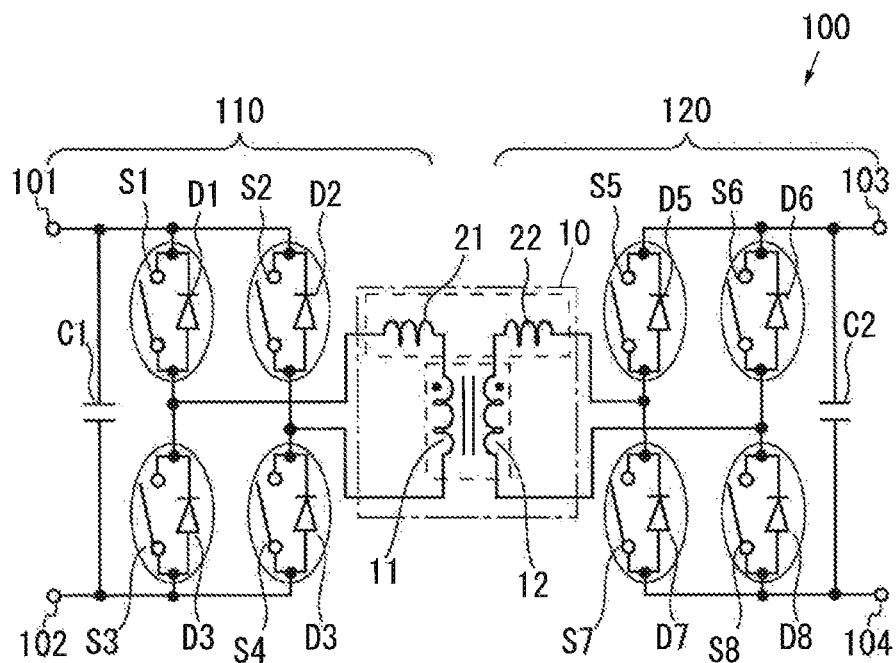
FIG. 1 is a circuit diagram of a bidirectional DC-DC converter using a transformer according to one embodiment of the disclosure.

Hereinafter, specific embodiments to which the present technology is applied will be described in detail with reference to the drawings. FIG. 1 is a circuit diagram of a bidirectional direct current to direct current (DC-DC) converter 100 using a transformer according to one embodiment of disclosure. In FIG. 1, the bidirectional DC-DC converter 100 includes a primary conversion circuit portion 110 on the left side in the figure and a secondary conversion circuit portion 120 on the right side in the figure with a transformer 10 therebetween. In the present embodiment, the primary conversion circuit portion 110 is a high voltage side circuit, and the secondary conversion circuit portion 120 is a low voltage side circuit.

A smoothing capacitor C1, a first switching arm formed by connecting a source of a switching device S1 to a drain of a switching device S3, and a second switching arm formed by connecting a source of a switching device S2 to a drain of a switching device S4, are connected in parallel between a positive electrode 101 and a negative electrode 102 which are input/output terminals of the primary conversion circuit portion 110.

Also, a primary coil 11 of the transformer 10 is connected between a connection point between the source of the switching device S1 and the drain of the switching device S3 and a connection point between the drain of the switching device S4 and the source of the switching device S2.

A smoothing capacitor C2 is connected between a positive electrode 103 and a negative electrode 104, which are input/output terminals of the secondary conversion circuit portion 120. In addition, a first switching arm formed by connecting a source of a switching device S5 to a drain of a switching device S7 and a second switching arm formed by connecting a source of a switching device S6 to a drain of a switching device S8, are connected in parallel between the positive electrode 103 and the negative electrode 104.

A secondary coil 12 of the transformer 10 is connected between a connection point between the source of the switching device S5 and the drain of the switching device S7 and a connection point between the drain of the switching device S8 and the source of the switching device S6.

In this embodiment, an N type metal-oxide semiconductor field-effect-transistor (MOSFET) is used as the switching devices S1 to S8, but types of the switching device of the disclosure are not limited thereto. As types of this switching device, for example, a P type MOSFET, an insulated gate bipolar transistor (IGBT), or other transistors may be employed.

Between the drain and the source in each of the switching devices S1 to S8, freewheeling diodes D1 to D8 are respectively connected so that a current flows from the source side to the drain side. Here, it is also possible to use parasitic diodes (body diodes) of the switching devices S1 to S8 as the freewheeling diodes D1 to D8. The switching devices S1 to S8 are subjected to switching control by a control device (not illustrated).

In FIG. 1, a coil 21 and a coil 22 illustrated inside the transformer 10 are virtual ones by which actions of leakage inductances of the primary coil 11 and the secondary coil 12 are respectively represented as an equivalent circuit. When the leakage inductance is set to a predetermined value, the transformer 10 of the present embodiment functions as an energy storage element like a choke coil.

Figure 2:
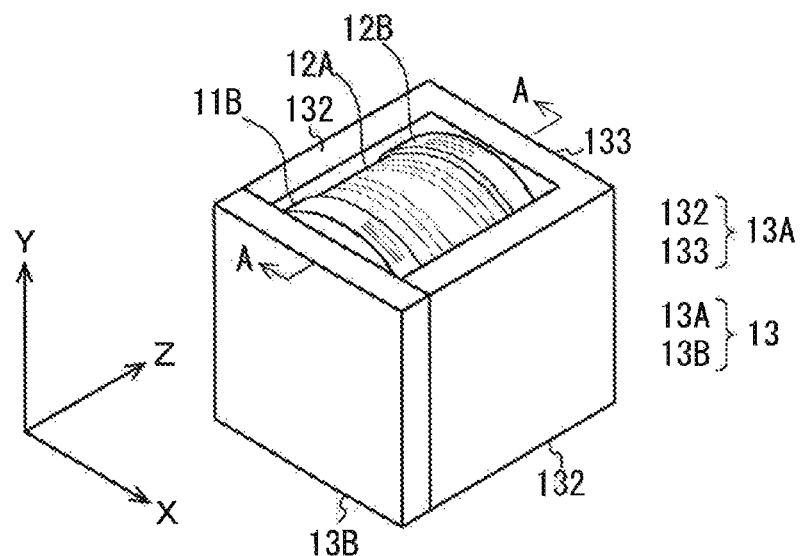
FIG. 2 is an external perspective view of the transformer.

FIG. 2 is an external perspective view of the transformer 10, FIG. 3 is an exploded perspective view of the transformer 10, and FIG. 4 is a cross-sectional view taken along line A-A illustrated in FIG. 2. The transformer 10 includes the primary coil 11, the secondary coil 12, and a core 13. Also, FIGS. 2 to 4 schematically illustrate the transformer 10, and shapes of the primary coil 11, the secondary coil 12, and the core 13 in FIGS. 2 to 4 does not necessarily coincide with shapes of each part in an actual transformer.

The core 13 is formed in an E-I shape having a first core portion 13A having an E-shaped X-Z cross section and a second core portion 13B having an I-shaped X-Z cross section. The first core portion 13A includes a center leg 131, side legs 132 surrounding both sides of the center leg 131, and a plate-shaped portion 133 connecting the center leg 131 to the left and right side legs 132. In other words, the left and right side legs 132 and the plate-shaped portion 133 are joined in an angular U shape, and the center leg 131 is joined to a center of an inner wall surface (Y-X surface) of the plate-shaped portion 133 which is an inner side of the angular U-shape. The center leg 131 has a circular bottom surface joined to the plate-shaped portion 133 and is a columnar shape having a predetermined height from the inner wall surface of the plate-shaped portion 133. The primary coil and the secondary coil are coaxially wound around the center leg 131. A straight line passing through a center of the bottom surface of the center leg 131 on the side of the plate-shaped portion 133 and a center of the other end surface is defined as a central axis 139 (FIG. 4).

Then, the I-shaped second core portion 13B is assembled onto an opening portion of the angular U-shape formed by the left and right side legs 132 and the plate-shaped portion 133, and thereby a closed magnetic circuit is formed. Although a material of the core 13 is not particularly limited, ferrite is employed in the present embodiment to reduce core loss in a high frequency band.

The primary coil 11 and the secondary coil 12 are winding wires having a circular cross section in which conducting wires of copper or a copper alloy with an insulating coated are wound. Materials and shapes of the primary coil 11 and the secondary coil 12 are not limited thereto, and a rectangular wire or a stranded wire may be used.

As illustrated in FIG. 4, a winding wire forming the primary coil 11 is wound in two layers around an outer circumference of the center leg 131 of the core 13 to form a first primary coil portion 11A, and a winding wire forming the secondary coil 12 is wound in two layers around an outer circumference of this first primary coil portion 11A to form a first secondary coil portion 12A. The example of FIG. 4 has a configuration in which the primary coil 11 and the secondary coil 12 are provided in a region around the center leg 131 and between the inner wall of the plate-shaped portion 133 and an inner wall of the second core portion 13B. The first primary coil portion 11A and the first secondary coil portion 12A are uniformly wound over the entire width (hereinafter also referred to as a winding width) WA of the center leg 131 in a direction of the central axis 139 in this region.

Then, one end of the first primary coil portion 11A is drawn out to the outside to form a lead wire 11C (FIG. 3), and the other end portion is wound around a portion of the winding width WA on an outer circumference of the first secondary coil portion 12A to form a second primary coil portion 11B. In the present embodiment, the second primary coil portion 11B is formed by winding wire three times starting from a position abutting the inner wall of the second core portion 13B without spacing and further winding the wire three times around an outer circumference thereof. An end portion of the winding wire after forming the second primary coil portion 11B, that is, an end portion not connected to the first primary coil portion 11A is drawn out to the outside to form a lead wire 11D.

Similarly, one end of the first secondary coil portion 12A is drawn out to the outside to form a lead wire 12C (FIG. 3), and the other end portion is wound around a portion of the winding width WA on the outer circumference of the first secondary coil portion 12A at a predetermined distance WB from the second primary coil portion 11B to form a second secondary coil portion 12B. In the present embodiment, the second secondary coil portion 12B is formed by winding wire three times starting from a position abutting the inner wall of the plate-shaped portion 133 without spacing and further winding the wire three times around an outer circumference thereof. An end portion of the winding wire after forming the second secondary coil portion 12B, that is, an end portion not connected to the first secondary coil portion 12A is drawn out to the outside to form a lead wire 12D.

As described above, since the first primary coil portion 11A and the first secondary coil portion 12A are coaxially wound over the same winding width WA and form a layered winding, a degree of coupling between the first primary coil portion 11A and the first secondary coil portion 12A increases. As a result, the first primary coil portion 11A and the first secondary coil portion 12A function to mainly transmit electric power. Here, the degree of coupling is a degree indicating the extent to which the primary coil (the first primary coil portion 11A) and the secondary coil (the first secondary coil portion 12A) act as a transformer, and, for example, is a ratio (coupling coefficient) of effective inductance to self-inductance. This degree of coupling (coupling coefficient) is obtained by actually measuring self-inductance and leakage inductance, for example, by the measuring method prescribed in JIS C 5321.

Since the second primary coil portion 11B and the second secondary coil portion 12B are wound with the predetermined distance WB therebetween in the direction of the central axis 139 and form a split winding, a degree of coupling between the second primary coil portion 11B and the second secondary coil portion 12B is set to be lower than the degree of coupling between the first primary coil portion 11A and the first secondary coil portion 12A. Thereby, the leakage inductance can be set to a required value, and it functions as if a choke coil were provided.

This leakage inductance increases in proportion to the number of turns of the second primary coil portion 11B and the second secondary coil portion 12B, or to a ratio of the number of turns of the second primary coil portion 11B to the first primary coil portion 11A and a ratio of the number of turns of the second secondary coil portion 12B to the first secondary coil portion 12A. Therefore, the number of turns or the ratio of the number of turns is set so that the leakage inductance becomes a required value. Particularly in the present embodiment, since the second primary coil portion 11B and the second secondary coil portion 12B are arranged on an outer side of the first primary coil portion 11A and the first secondary coil portion 12A, a distance from the second primary coil portion 11B and the second secondary coil portion 12B to the center leg 131 is longer than a distance from the first primary coil portion 11A and the first secondary coil portion 12A to the center leg 131, and thereby having a configuration which allows a leakage inductance to be generated easily. Therefore, the configuration is advantageous in setting the leakage inductance to a predetermined value depending on the number of turns or the ratio of the number of turns of the second primary coil portion 11B and the second secondary coil portion 12B.

As described above, according to the present embodiment, since it is possible to obtain the same effect as in a configuration in which a choke coil is provided by setting the leakage inductance of the transformer 10 to a predetermined value, there is no need to provide a choke coil, and thereby a size, weight, and loss can be reduced as compared with a conventional configuration in which a choke coil is actually provided.

FIG. 5 is a view showing a comparison example between a conventional configuration in which a choke coil is provided separately from a transformer and a configuration of the transformer of the present embodiment.

In FIG. 5, Example 1 represents the transformer 10 having the configuration of FIGS. 2 to 4 with a capacity of 4 kW, and Comparative Example 1 represents a conventional configuration with a capacity of 4 kW and in which a choke coil is provided separately from a transformer. In addition, Example 2 represents the transformer 10 having the configuration of FIGS. 2 to 4 with a capacity of 6 kW, and Comparative Example 2 represents a conventional configuration with a capacity of 6 kW and in which a choke coil is provided separately from a transformer. A volume ratio, a weight ratio, and a loss ratio in FIG. 5 represent values of Examples 1 and 2 when those of Comparative Examples 1 and 2 are set to 100%.

As shown in FIG. 5, in Example 1, the volume ratio is 74.2%, the weight ratio is 87.2%, and the loss ratio is 48.9%, all of which are reduced as compared with Comparative Example 1. In addition, in Example 2, the volume ratio is 82.9%, the weight ratio is 95.6%, and the loss ratio is 40.9%, and all of which are reduced as compared with Comparative Example 2.

Also, according to the present embodiment, since the second primary coil portion 11B and the second secondary coil portion 12B are provided to be spaced apart from each other at a predetermined distance WB, heat generated in the first primary coil portion 11A and the first secondary coil portion 12A can escape from the separation portion, and thereby an influence of heat generation can be reduced.

Further, according to the present embodiment, it is configured such that the first primary coil portion 11A and the first secondary coil portion 12A mainly transmit electric power and the second primary coil portion 11B and the second secondary coil portion 12B mainly adjust the leakage inductance, and since a portion contributing to the power transmission and a portion contributing to the adjustment of the leakage inductance are clearly separated, it is easy to design the transformer and set the leakage inductance.

Particularly in the present embodiment, design of the bidirectional DC-DC converter 100 is facilitated by configuring the primary coil 11 and the secondary coil 12 to have the same number of turns and to have a symmetrical configuration.

Modified Example

In FIG. 4, an example in which the first primary coil portion 11A is wound on the inner side and the first secondary coil portion 12A is wound around the outer side thereof has been illustrated, but the disclosure is not limited thereto, and the first secondary coil portion 12A may be wound on the inner side and the first primary coil portion 11A may be wound around the outer side thereof.

Figure 6:
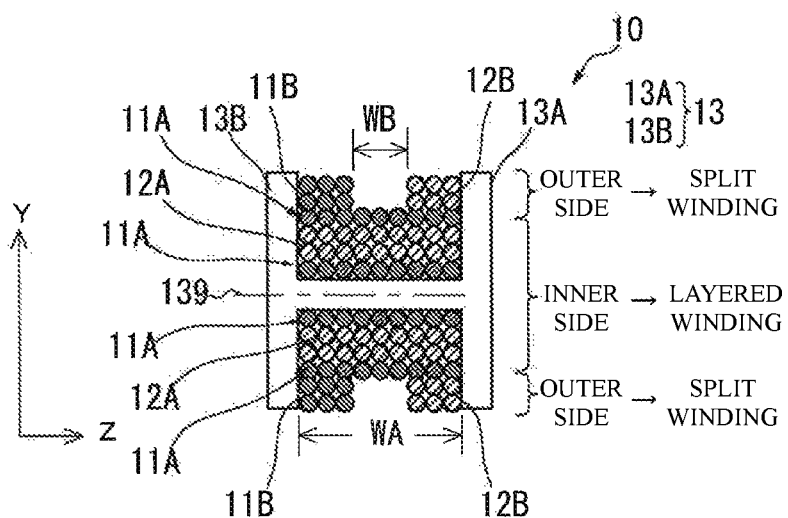
FIG. 6 is a view illustrating a first modified example of the transformer.

FIG. 6 is a view illustrating a first modified example of the transformer 10. In the example of FIG. 6, one layer of the first primary coil portion 11A is wound around the outer circumference of the center leg 131, two layers of the first secondary coil portion 12A are wound around an outer side thereof, and the first primary coil portion 11A is wound around an outer side thereof, thereby forming a so-called sandwich winding structure. The configuration is otherwise the same as that in the above-described embodiment. Thereby, the degree of coupling between the first primary coil portion 11A and the first secondary coil portion 12A can be further increased.

Figure 7:
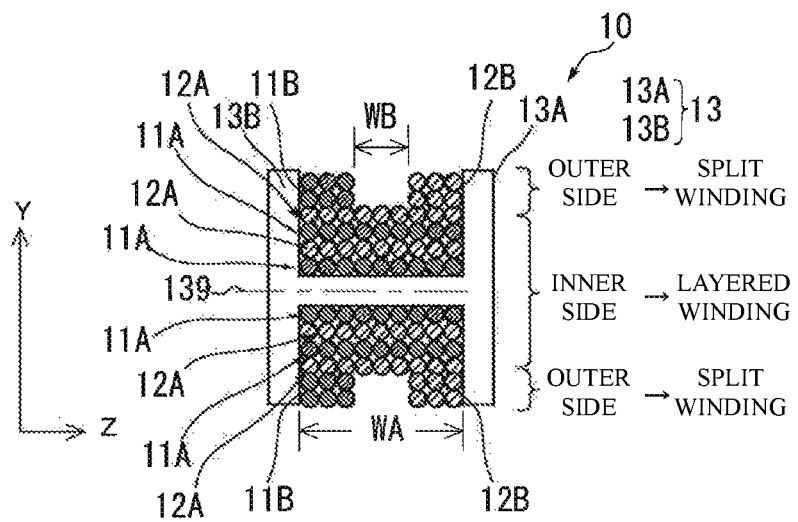
FIG. 7 is a view illustrating a second modified example of the transformer.

FIG. 7 is a view illustrating a second modified example of the transformer 10. In the example of FIG. 6, one layer of the first primary coil portion 11A is wound around the outer circumference of the center leg 131, and one layer of the first secondary coil portion 12A is wound around the outer side thereof, thereby a so-called sandwich winding structure being formed. Further, the first primary coil portion 11A is wound around an outside of this first secondary coil portion 12A, and one layer of the first secondary coil portion 12A is wound around an outer side thereof. The configuration is otherwise the same as that in the above-described embodiment. Further, in the example of FIG. 7, the first primary coil portion 11A and the first secondary coil portion 12A are alternately provided with the first primary coil portion 11A being on the innermost side, however, the disclosure is not limited thereto, and the first secondary coil portion 12A and the first primary coil portion 11A may be alternately provided with the first secondary coil portion 12A being on the innermost side.

In the present embodiment, layered winding is coaxially winding each winding wire of the first primary coil portion 11A and the first secondary coil portion 12A over the entire width of the winding width WA, and thereby the first primary coil portion 11A and the first secondary coil portion 12A of the present embodiment are provided to overlap each other in a layered shape with the center leg 131 as the center. In this embodiment, each of the sandwich windings illustrated in FIGS. 6 and 7 is a form of the layered winding.

The transformer, the DC-DC converter, and the like exemplified in the present embodiment are not limited to the description in the embodiment, and the configuration, operation, operation method, and the like can be appropriately modified within the scope of the technical spirit of the disclosure.

In the present embodiment, the example in which the primary conversion circuit portion side is set to a high voltage and the secondary conversion circuit portion side is set to low voltage has been described, but the disclosure is not limited thereto, and the primary conversion circuit portion side may be set to a low voltage and the secondary conversion circuit portion side may be set to a high voltage. That is, DC power at the input/output terminal of the primary conversion circuit portion may be boosted to output from the input/output terminal of the secondary conversion circuit portion, and DC power at the input/output terminal of the secondary conversion circuit portion may be stepped down to output from the input/output terminal of the primary conversion circuit portion.

Further, in the present embodiment, the example of the bidirectional DC-DC converter 100 has been described, but the disclosure is not limited thereto, and the DC-DC converter of the disclosure may be configured to convert a voltage in one direction. Although the DC-DC converter 100 of the present embodiment is of a full-bridge type, it is not limited thereto, and a half-bridge type, a push-pull type, a Ringing Choke Converter (RCC) type, or the like may also be employed. In the transformer, a midpoint tap may be provided in the first primary coil portion or the first secondary coil portion as needed.

Further, the transformer of the disclosure is not limited to the DC-DC converter, and can be used for other devices such as a power supply circuit, an inverter, a stabilizer of a welding machine, and the like.

What is claimed is:

1. A transformer comprising a primary coil and a secondary coil which are coaxially provided, wherein:
   the primary coil includes a first primary coil portion and a second primary coil portion in series;
   the secondary coil includes a first secondary coil portion and a second secondary coil portion in series;
   the second primary coil portion and the second secondary coil portion are provided outside the first primary coil portion and the first secondary coil portion;
   the first primary coil portion and the first secondary coil portion are coaxially wound over the same winding width and form a layered winding structure, and that the second primary coil portion and the second secondary coil portion are wound with a predetermined distance and form a split winding structure; and
   a degree of coupling between the second primary coil portion and the second secondary coil portion is set to be lower than a degree of coupling between the first primary coil portion and the first secondary coil portion, wherein each of the first primary coil portion and the first secondary coil portion is formed with continuous windings, the second primary coil portion is wound around the first secondary coil portion and the first primary coil portion, and the second secondary coil portion is wound around the first secondary coil portion and the first primary coil portion.

2. The transformer according to claim 1, wherein the first primary coil portion and the first secondary coil portion have a layered winding structure, and the second primary coil portion and the second secondary coil portion form a split winding structure.

3. A direct current to direct current (DC-DC) converter including the transformer according to claim 1.

4. A direct current to direct current (DC-DC) converter including the transformer according to claim 2.

* * * * *